(12) United States Patent
Yaldo et al.

(10) Patent No.: US 10,593,212 B2
(45) Date of Patent: Mar. 17, 2020

(54) AUTONOMOUS PARKING METHODS AND SYSTEMS FOR AUTONOMOUS VEHICLES

(71) Applicant: GM GLOBAL TECHNOLOGY OPERATIONS LLC, Detroit, MI (US)

(72) Inventors: Valor Yaldo, West Bloomfield, MI (US); Xiaofeng F. Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 15/620,434

(22) Filed: Jun. 12, 2017

(65) Prior Publication Data
US 2018/0357906 A1 Dec. 13, 2018

(51) Int. Cl.
| | | |
|---|---|---|
| G05D 1/00 | (2006.01) | |
| G08G 1/16 | (2006.01) | |
| G08G 1/14 | (2006.01) | |
| G08G 1/00 | (2006.01) | |
| B62D 15/02 | (2006.01) | |
| G05D 1/02 | (2020.01) | |

(52) U.S. Cl.
CPC ......... *G08G 1/168* (2013.01); *B62D 15/0285* (2013.01); *G05D 1/0088* (2013.01); *G05D 1/0212* (2013.01); *G08G 1/14* (2013.01); *G08G 1/142* (2013.01); *G08G 1/146* (2013.01); *G08G 1/202* (2013.01)

(58) Field of Classification Search
CPC .......... G08G 1/168; G08G 1/14; G08G 1/146; G05D 1/0212; G05D 1/0088; G05D 1/00; B62D 15/0285; B60W 30/06
See application file for complete search history.

(56) References Cited

U.S. PATENT DOCUMENTS

| | | | |
|---|---|---|---|
| 8,095,273 B2 | 1/2012 | Moshchuk et al. | |
| 8,099,214 B2 | 1/2012 | Moshchuk et al. | |
| 8,352,112 B2 | 1/2013 | Mudalige | |
| 8,862,321 B2 | 10/2014 | Moshchuk et al. | |
| 9,299,256 B2 | 3/2016 | Chen et al. | |
| 9,305,464 B2 | 4/2016 | Lacoste et al. | |
| 2009/0260907 A1 | 10/2009 | Moshchuk et al. | |
| 2010/0019935 A1* | 1/2010 | Kawabata | B60R 1/00 340/932.2 |
| 2010/0271236 A1 | 10/2010 | Moshchuk et al. | |
| 2014/0062727 A1* | 3/2014 | Aivas | G08G 1/146 340/932.2 |
| 2014/0344027 A1 | 11/2014 | Frank et al. | |
| 2015/0149265 A1 | 5/2015 | Huntzicker et al. | |
| 2016/0125736 A1* | 5/2016 | Shaik | G08G 1/14 701/23 |
| 2018/0130351 A1* | 5/2018 | Ha | B60R 1/00 |
| 2019/0196491 A1* | 6/2019 | Balogh | G05D 1/0282 |

* cited by examiner

*Primary Examiner* — Genna M Mott
(74) *Attorney, Agent, or Firm* — Lorenz & Kopf, LLP

(57) ABSTRACT

A method for an autonomous vehicle to perform an autonomous parking maneuver is provided. The method includes operating the autonomous vehicle to a destination and then operating the autonomous vehicle to a first parking location at the destination utilizing stored first coordinates of the first parking location. Next the autonomous vehicle determines whether the first parking location is available and performs the autonomous parking maneuver at the first location when the first parking location is available.

10 Claims, 11 Drawing Sheets

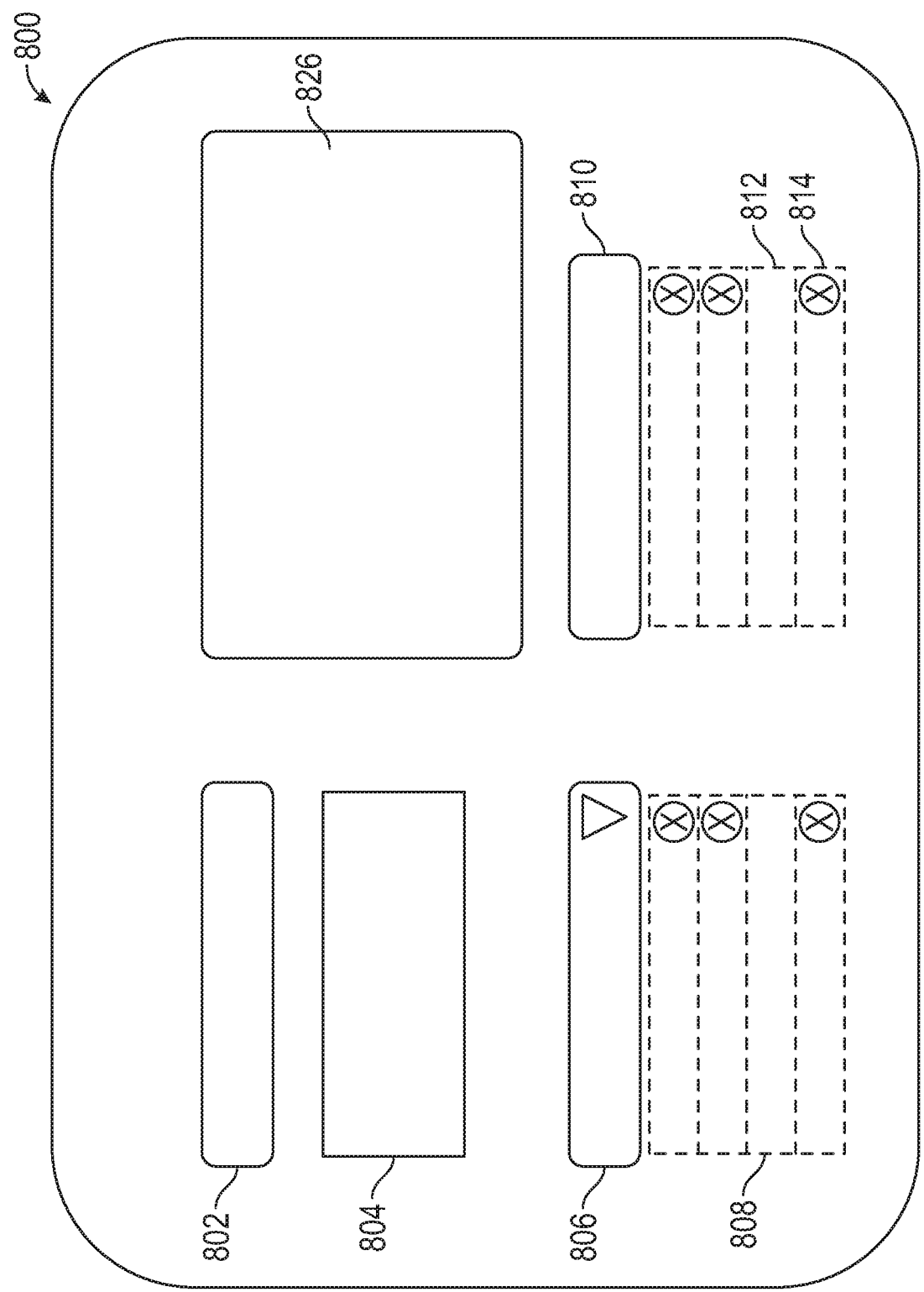

AUTONOMOUS PARKING METHODS AND SYSTEMS FOR AUTONOMOUS VEHICLES

INTRODUCTION

The present disclosure generally relates to autonomous vehicles, and more particularly relates to methods and systems for performing an autonomous parking procedure enabling end-to-end autonomous vehicle operation.

Autonomous vehicle technology has advanced greatly and a number of autonomous and semi-autonomous vehicles are being tested or operated on the roadways. While some contemporary vehicles offer autonomous parallel parking, angle parking or straight (pull in), selecting a parking space and parking within a parking lot continues to be a manual operation.

Accordingly, it is desirable to provide autonomous parking in a parking lot for an autonomous vehicle. In addition, it is desirable to have the autonomous vehicle operate to autonomously park in preselected preferential parking locations. Furthermore, other desirable features and characteristics of the present disclosure will become apparent from the subsequent detailed description of the disclosure and the appended claims, taken in conjunction with the accompanying drawings and the background of the disclosure.

SUMMARY

A method for programming an autonomous vehicle to perform an autonomous parking maneuver provided. The method includes operating the autonomous vehicle to a first parking location and storing data representing first coordinates for the first parking location. Thereafter, the autonomous vehicle may perform a next autonomous parking maneuver using the first coordinates when the first parking location is available.

In another aspect of the disclosure, the autonomous vehicle is operated to a second parking location data representing second coordinates for the second parking location is stored. Thereafter, the autonomous vehicle may perform a next autonomous parking maneuver using the first coordinates when the first parking location is available and utilizing the second coordinates when the first parking location is not available and the second parking location is available.

In another aspect of the disclosure destination information associated with the first parking location is also stored.

In another aspect of the disclosure, a value representing a number of parking locations adjacent to the first parking location in which the autonomous vehicle may perform a next parking maneuver when the first parking location is not available is stored.

In another aspect of the disclosure, the first parking location comprises a temporary parking location and the method further comprises storing data representing a parking time limit for parking in the temporary parking location.

A method for an autonomous vehicle to perform an autonomous parking maneuver is provided. The method includes operating the autonomous vehicle to a destination and then operating the autonomous vehicle to a first parking location at the destination utilizing stored first coordinates of the first parking location. Next the autonomous vehicle determines whether the first parking location is available and performs the autonomous parking maneuver at the first location when the first parking location is available.

In another aspect of the disclosure, the autonomous vehicle performs the autonomous parking maneuver at any available parking location when the first parking location is not available.

In another aspect of the disclosure, the autonomous vehicle is operated to a second parking location at the destination utilizing stored second coordinates of the second parking location when the first parking location is not available. Next, the autonomous vehicle determines whether the second parking location is available and performs the autonomous parking maneuver at the second location when the second parking location is available.

In another aspect of the disclosure, the autonomous parking maneuver is performed at any available parking location when the first and second parking locations are not available.

In another aspect of the disclosure, the autonomous vehicle determines whether one of a predetermined number of parking locations adjacent to the first parking location is available and performs the autonomous parking maneuver at any available parking location of the predetermined number of parking locations adjacent to the first parking location.

In another aspect of the disclosure, the first parking location comprises a temporary parking location and the method includes performing the autonomous parking maneuver at the temporary parking location when the temporary parking location is available. After parking, the autonomous vehicle determines whether a parking time limit for parking at the temporary parking location has expired. The autonomous vehicle remains in the temporarily parking location until the parking time period has expired and then the autonomous vehicle is operated away from the temporary parking location after the parking time period has expired.

In another aspect of the disclosure, the autonomous vehicle returns to the temporary parking location after a time period to determine whether the temporary parking location has become available.

In another aspect of the disclosure, the autonomous vehicle performs the autonomous parking maneuver at any available parking location when the temporary parking location remains unavailable.

In another aspect of the disclosure, the autonomous vehicle is operated away from the temporary parking location when the temporary parking location is not available and later returns to the temporary parking location after a time period to determine whether the temporary parking location has become available.

In another aspect of the disclosure, the autonomous vehicle performs the autonomous parking maneuver at the any available parking location when the temporary parking location remains unavailable.

A method for performing a drop off/pick up operation via an autonomous vehicle is provided. The method includes operating the autonomous vehicle to a destination and then operating the autonomous vehicle to a temporary parking location at the destination utilizing stored coordinates of the temporary parking location. Next the autonomous vehicle determines whether the temporary parking location is available and performs the autonomous parking maneuver at the temporary location when the temporary parking location is available. The autonomous vehicle remains in the temporary parking location until the drop off/pick up operation is complete or a parking time limit has expired.

In another aspect of the disclosure, the autonomous vehicle determines that the drop off/pick up operation is complete upon receiving an instruction to proceed to another destination.

In another aspect of the disclosure, the autonomous vehicle returns to the temporary parking location after a time period to determine whether the temporary parking location has become available.

In another aspect of the disclosure, the autonomous vehicle performs the autonomous parking maneuver at any available parking location when the temporary parking location remains unavailable.

In another aspect of the disclosure, the autonomous vehicle performs the autonomous parking maneuver at any available parking location after the parking time limit expires.

BRIEF DESCRIPTION OF THE DRAWINGS

The present disclosure will hereinafter be described in conjunction with the following drawing figures, wherein like numerals denote like elements.

FIGS. 8A-8B are illustrations of an autonomous parking programming screen for an autonomous vehicle in accordance with the present disclosure;

DETAILED DESCRIPTION

The following detailed description is merely exemplary in nature and is not intended to limit the disclosure or the application and uses of the disclosure. Furthermore, there is no intention to be bound by any theory presented in the preceding background or the following detailed description.

Figure 1:
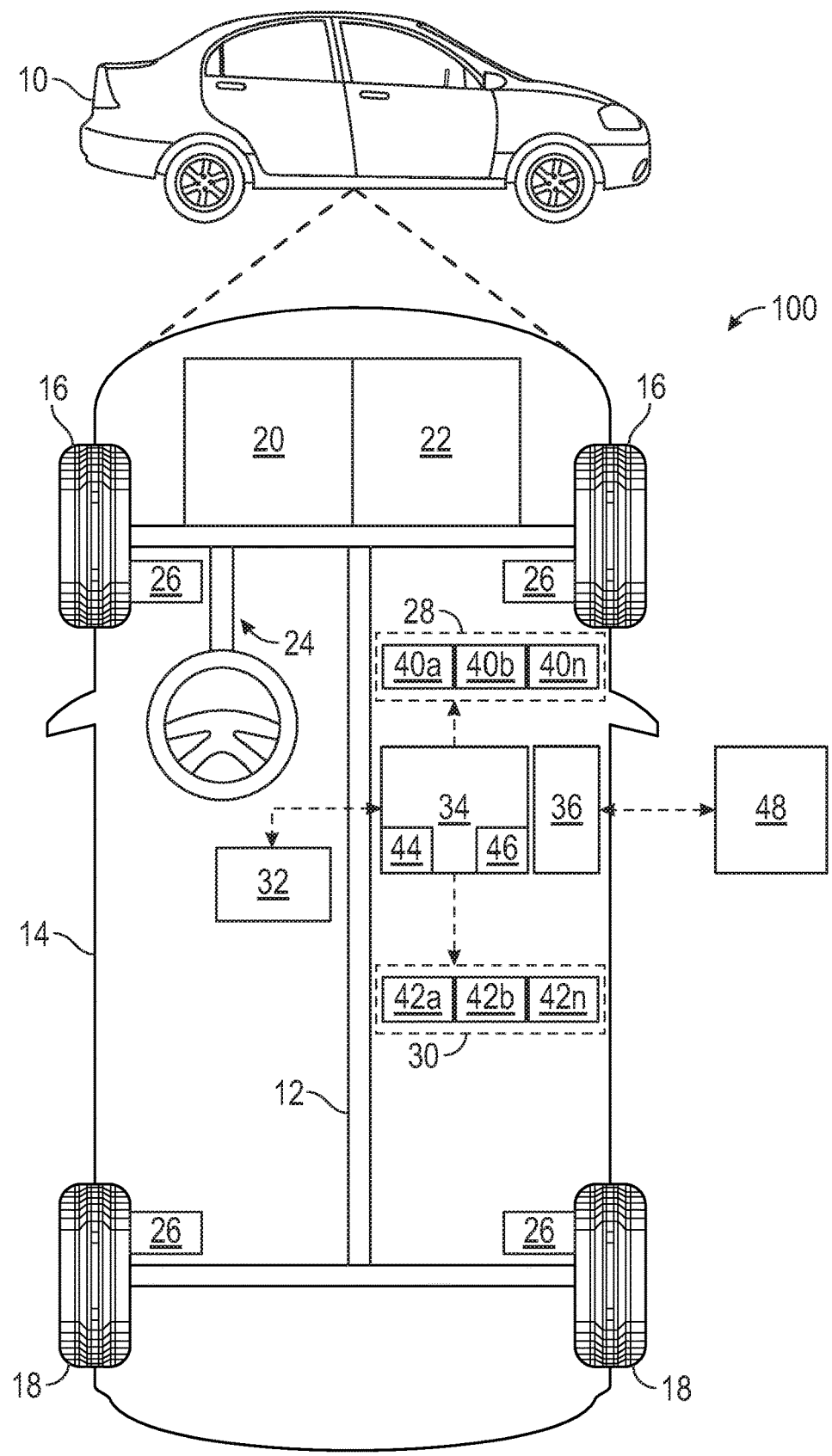
FIG. 1 is a functional block diagram illustrating an autonomous vehicle having an autonomous parking system in accordance with various embodiments.

Referring now to the drawings, wherein the figures are for the purpose of illustrating certain exemplary embodiments only and not for the purpose of limiting the disclosure or claims, FIG. 1 illustrates an exemplary autonomous vehicle 10 including, autonomous parking system 100 to provide an end-to-end autonomous driving experience. The autonomous parking system 100 intelligently controls the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the autonomous systems 100 including an autonomous parking that is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
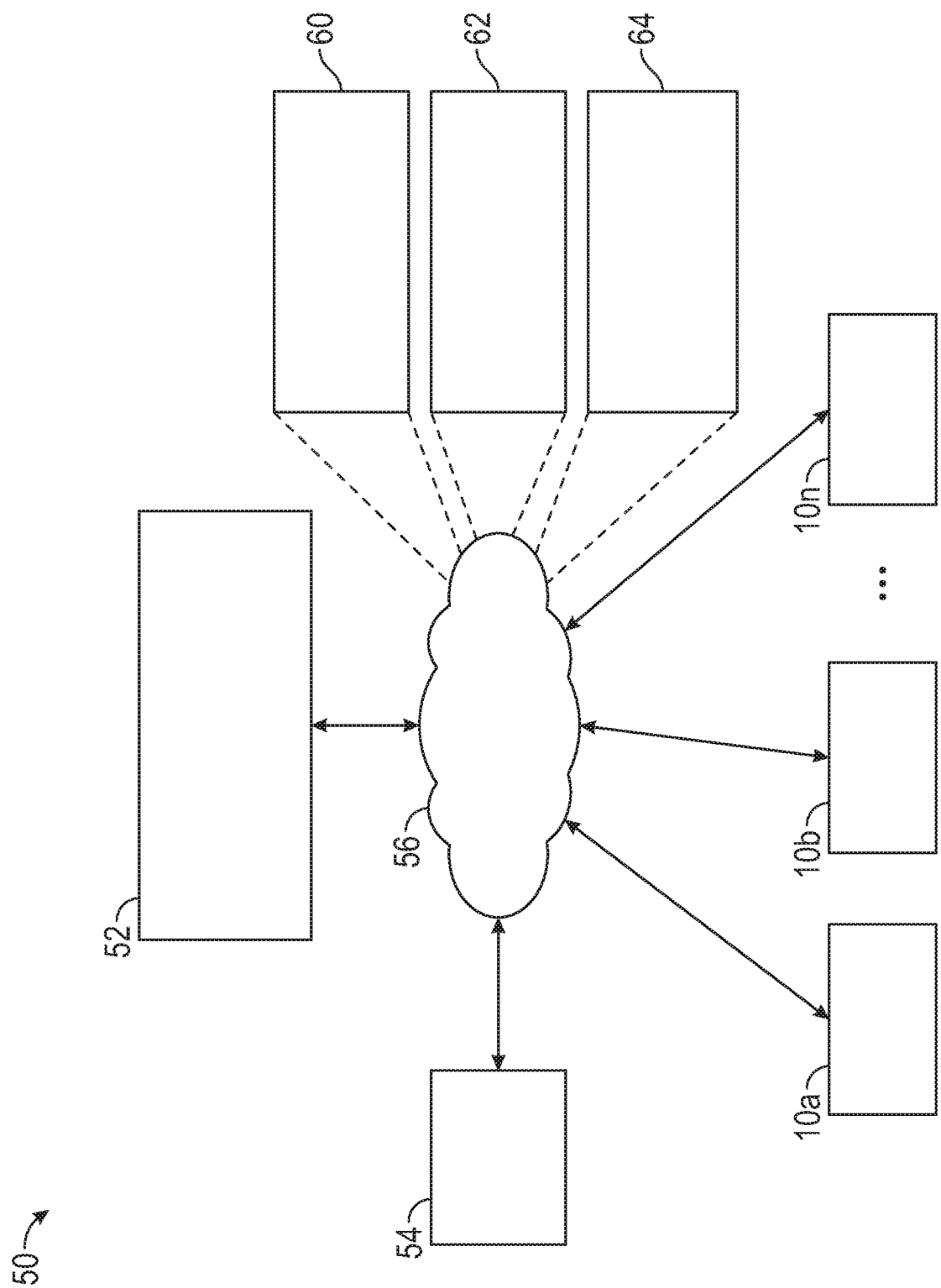
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the autonomous parking system 100 and, when executed by the processor 44, provide for programming one or more preferred parking locations at a destination as selected by an operator. Then, upon the next trip to that destination, the autonomous vehicle 10 operates to autonomously park at the preferred parking locations in the order entered as well be discussed in connection with FIGS. 4-11.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
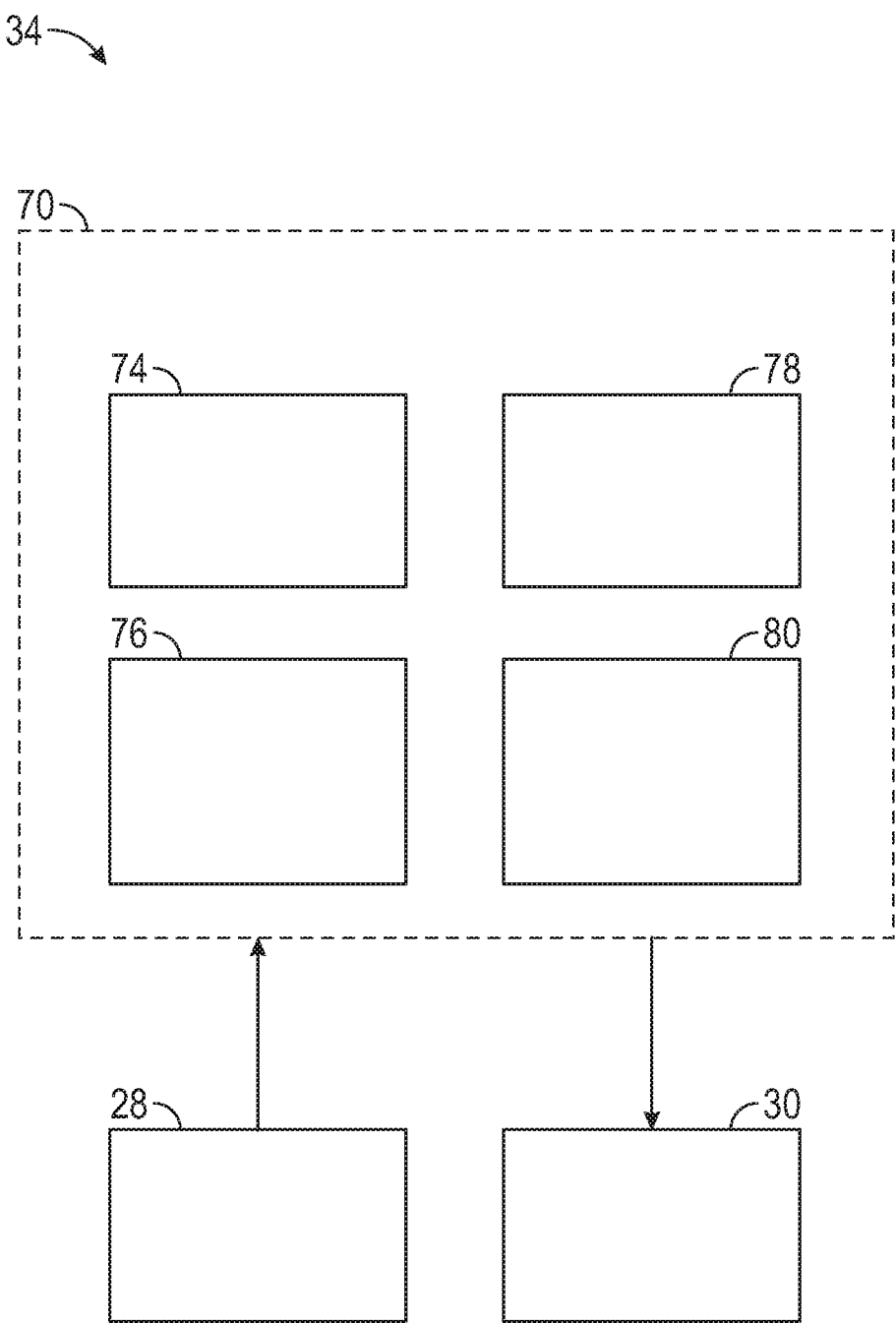
FIG. 3 are dataflow diagrams illustrating an autonomous driving system that includes the autonomous parking system of the autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
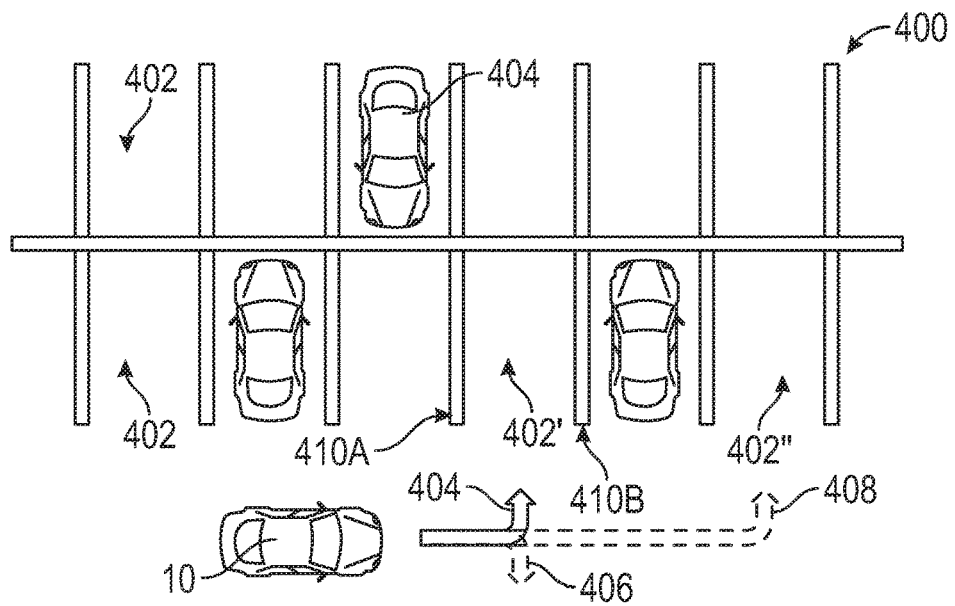
FIG. 4 as an illustration of an autonomous parking maneuver performed by an autonomous vehicle in accordance with the present disclosure.
Figure 4:
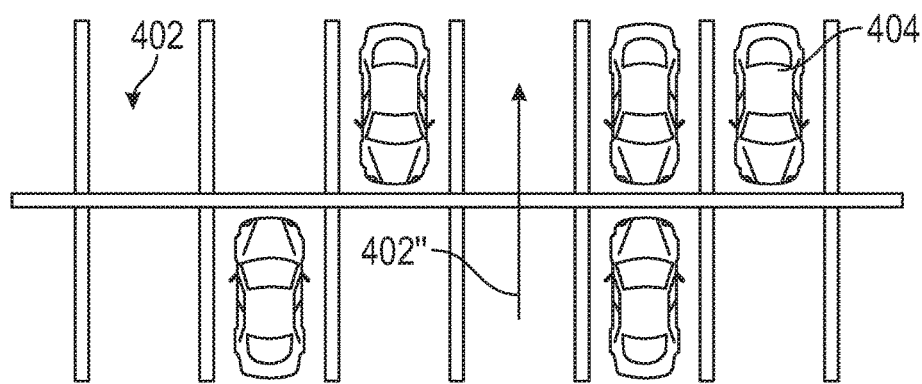
Figure 5:
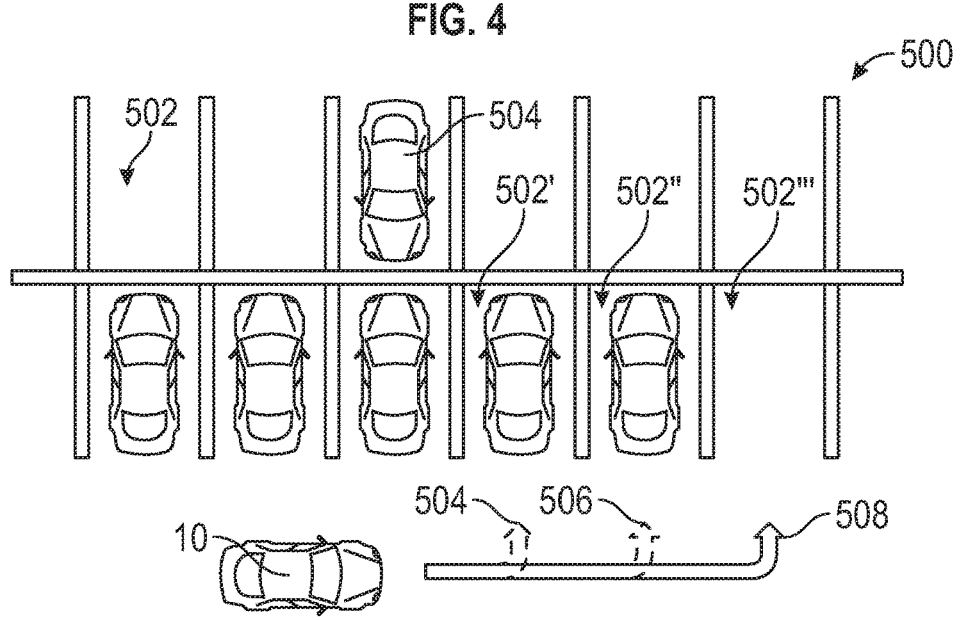
FIG. 5 is an illustration of another autonomous parking maneuver performed by an autonomous vehicle in accordance with the present disclosure.
Figure 6:
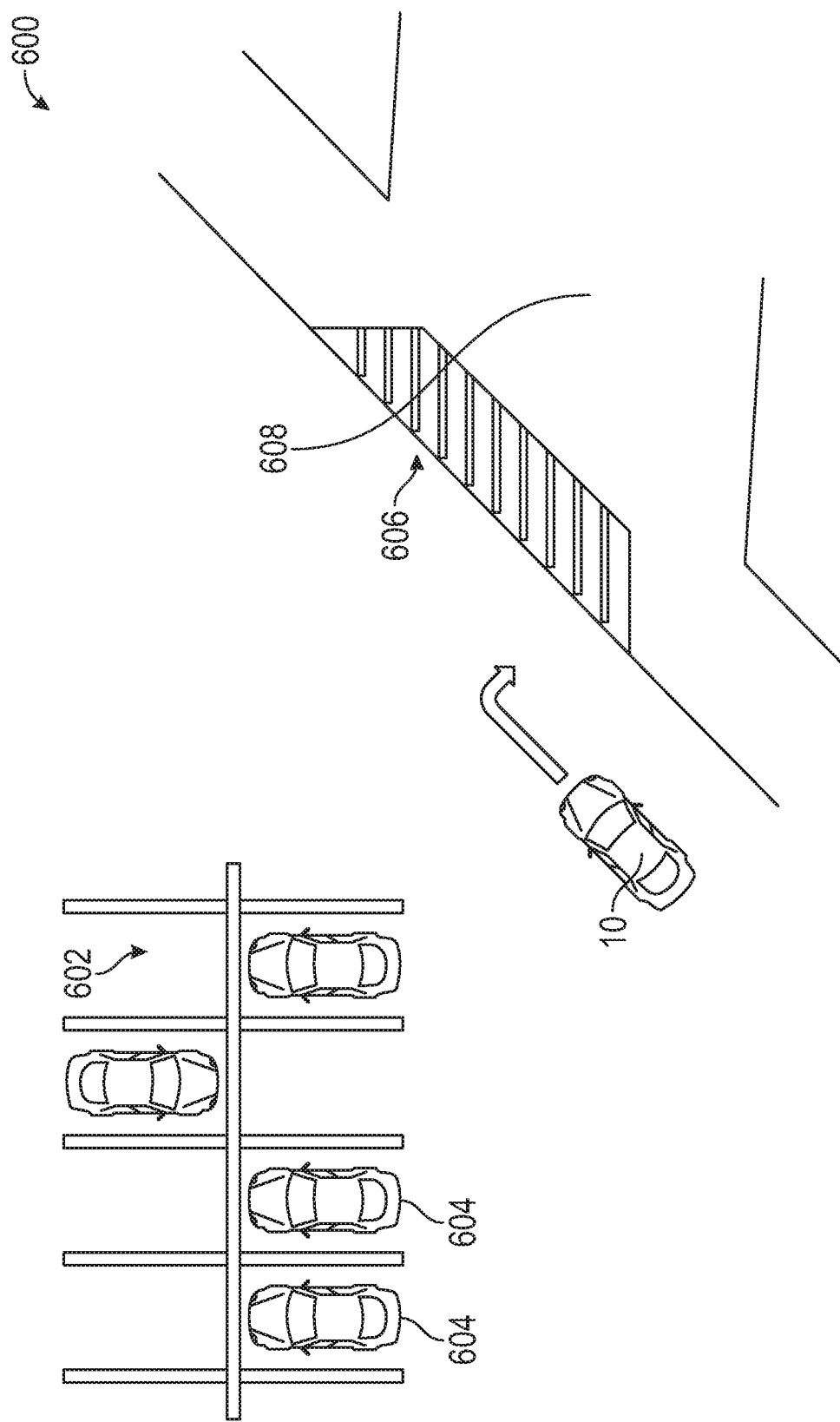
FIG. 6 is an illustration of an autonomous temporary parking maneuver performed by the autonomous vehicle in accordance with the present disclosure.

As mentioned above, the autonomous systems 100 of FIG. 1 that include the autonomous parking system of the present disclosure is included within the ADS 70 of FIG. 3 the operation of which can be understood with reference to FIGS. 4-6, describing how the present disclosure provides methods and systems for performing autonomous parking by an autonomous vehicle to provide end-to-end autonomous vehicle operation. As used herein, "autonomous parking" means autonomously parking an autonomous vehicle in angle parking or straight (pull in) parking space in a parking lot or similar parking area. As used herein, autonomous parking is distinguished from autonomous parallel parking along a street or roadway. In fundamental embodiments, the disclosure provides that an autonomous vehicle is preprogrammed for a preferred (or a series of preferred) parking locations at any given destination and can use onboard sensors to determine whether the preferred parking location is available, and if so, to perform an autonomous parking maneuver.

FIG. 4 illustrates a parking lot 400 having a plurality of parking locations 402 some of which are occupied by vehicles 404. The parking lot 400 may be any parking lot (parking area) at any given destination, non-limiting examples of which include parking areas at shopping malls, grocery markets, or a place of employment. As will be discussed in more detail below in connection with FIG. 7 and FIG. 8, exemplary embodiments of the present disclosure contemplate that the autonomous vehicle 10 will have been preprogrammed with a preferred (or a series of preferred) parking location in the parking lot 400.

Upon arriving at the destination (whether autonomously, semi-autonomously or manually) the autonomous vehicle 10 navigates to a first preferred parking location 402' and determine whether that parking location is available. In accordance with exemplary embodiments, the autonomous vehicle 10 may make this determination using any of the sensor data available to the autonomous vehicle, non-limiting examples of which include radar or camera imaging. The preferred parking location 402' may be unavailable for a variety of reasons, non-limiting examples of which include the parking location 402' is occupied by another vehicle or the parking location 402' is blocked for line striping or surface repair. If the first preferred parking location 402' is available, the autonomous vehicle 10 performs an autonomous parking maneuver as indicated at 404 using the autonomous sensor data available. This may include a series of predefined maneuver instructions that when executed by the processor cause one or more actuators of the actuator system to control steering, acceleration, and braking to keep the autonomous vehicle 100 between the parking stripes 410A and 410B. However, in the event that the first preferred parking location 402' is not available, the present disclosure contemplates that the autonomous vehicle 10 may then operate to a next preferred parking location 402", and determine whether that parking location is available. The next preferred parking location may be adjacent to the first preferred parking location, in another parking row of the parking lot 300 or in another parking area at the destination as programmed by the operator. If the next preferred parking location 402" is available, the autonomous vehicle 10 will perform an autonomous parking maneuver as indicated 406. In the event that the next preferred parking location 402" is also not available, the autonomous vehicle 10 may then proceed to the next in a series of preprogrammed preferred parking locations that have been programmed by the operator in order of preference. In the example illustrated in FIG. 4, the operator of the autonomous vehicle 10 has preprogrammed a third preferred parking location 402'" for which the autonomous vehicle 10 will perform the parking maneuver as indicated at 408 if parking location 402'" is available. In the event that all preprogrammed preferred parking locations are occupied, the present disclosure contemplates that the autonomous vehicle 10 may park in any available parking location to conclude the journey to the destination.

FIG. 5 illustrates another programming option for the operator of an autonomous vehicle 10. As illustrated in FIG. 5 a parking lot 500 includes a plurality of parking locations 502 some of which are occupied by vehicles 504. The present disclosure contemplates that in selecting a preferred parking location, the operator of the autonomous vehicle 10 may also be willing to accept the next adjacent, or one of several adjacent, parking locations near the preferred parking location. Accordingly, and as will be discussed below in connection with FIG. 8, upon programming a preferred parking location using the method illustrated in FIG. 7, the operator is given an option to select a specified number of adjacent parking locations to the preferred parking location that may be used in the event that the preferred parking location is unavailable. As illustrated in FIG. 5, the first preferred parking location 502' of the autonomous vehicle 10 is occupied preventing the performance of an autonomous parking maneuver 504. However, in the example illustrated in FIG. 5, the operator has entered that the next two adjacent parking locations are acceptable. However, the first adjacent parking location 502" is also occupied preventing the autonomous vehicle 10 from performing the autonomous parking maneuver 506. However, a second adjacent parking location 502'" is available, and the autonomous vehicle 10 may perform the autonomous parking maneuver 508 and park in that parking location that is near the first preferred parking location, without the need for the operator to manually move the vehicle down adjacent parking locations to manually preprogram those locations is acceptable parking locations.

The present disclosure also contemplates that a preferred parking location may be a temporary parking location such as those commonly used as passenger drop-off or pickup locations or loading/unloading locations for packages or other items. Accordingly, FIG. 6 illustrates a parking area 600 having a plurality of parking locations 602, some of which are occupied by vehicles 604. The parking location 600 also includes a temporary parking location 606, which may be used to drop-off or pick up passengers along an entranceway 608 at the destination. As discussed above, the autonomous vehicle 10 first determines whether the temporary parking location 606 is available using sensor data available to the autonomous vehicle 10. If the temporary parking location 606 is not available (i.e., occupied) the autonomous vehicle may operate to circle the parking lot 600 or to otherwise move away from the temporary parking area 606 and later return for another temporary parking attempt. If after making the allotted temporary parking attempts as programmed by the operator, the autonomous vehicle 10 may park in any available parking location 602 or may park in one of a series of preferred parking locations as will be discussed in more detail in connection with FIG. 9.

The preprogramming for the temporary parking location 606 is accomplished in a similar manner to the preprogramming for preferred parking locations 602 as will be discussed in connection with FIG. 7 and FIG. 8. It is common for temperate parking areas to have a parking time limit after which the temporary parking area should be vacated and made available to other vehicles. Accordingly, the present disclosure contemplates that a time limit associated with a temporary parking area 606 may be programmed as will be discussed below in connection with FIG. 8.

Figure 7:
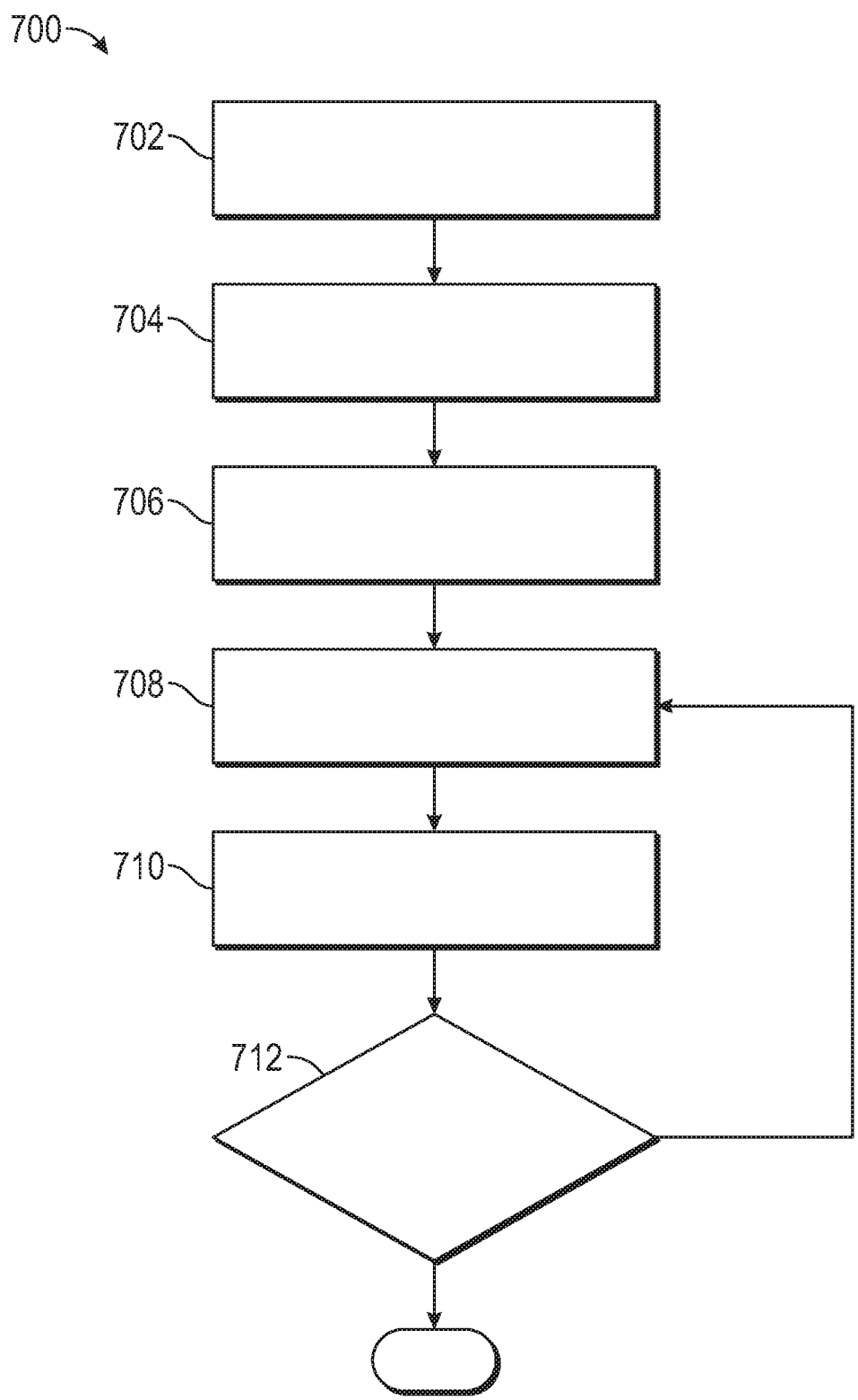
FIG. 7 is a flow diagram illustrating a method for programming an autonomous vehicle to perform an autonomous parking maneuver in accordance with the present disclosure.

FIG. 7 is a flow diagram illustrating an exemplary method for programming the autonomous vehicle 10 to locate preferred parking locations at any given destination. The routine begins in block 702 with the vehicle being operated (autonomously, semi-autonomously or manually) to a first destination. Once at the destination, the operator of the autonomous vehicle manually operates the vehicle to a first preferred parking location block 604. Once the autonomous vehicle is parked in the first preferred parking location the operator stores coordinates of the first preferred parking location in block 706 so that upon a later return to the destination the autonomous vehicle 10 could autonomously park in the first preferred parking location if available. As a non-limiting example, for the operator's home, the preferred parking location may be a preferred side of the driveway/garage. In larger or commercial parking lots (e.g., shopping mall, place of work) the operator may then manually operate the autonomous vehicle 10 to a next preferred parking location in block 708. Once the autonomous vehicle is parked in the next preferred parking location data representing coordinates of the next preferred parking locations are stored in block 710. Block 712 determines whether additional preferred parking locations are desired and if so returns the routine to block 708 where the operator may operate the vehicle to as many preferred parking locations in the order of the operator's preference for parking locations and store them in the autonomous vehicle 10 on a destination by destination basis. Therefore, after initial manual operation to set as many preferred parking locations for the autonomous vehicle as the operator desires, the autonomous vehicle may then operate autonomously end-to-end to the destination and to any of the available preferred parking spots, in the order of their preference, as selected by the operator as will be discussed below in connection with FIG. 9.

Figure 8A:
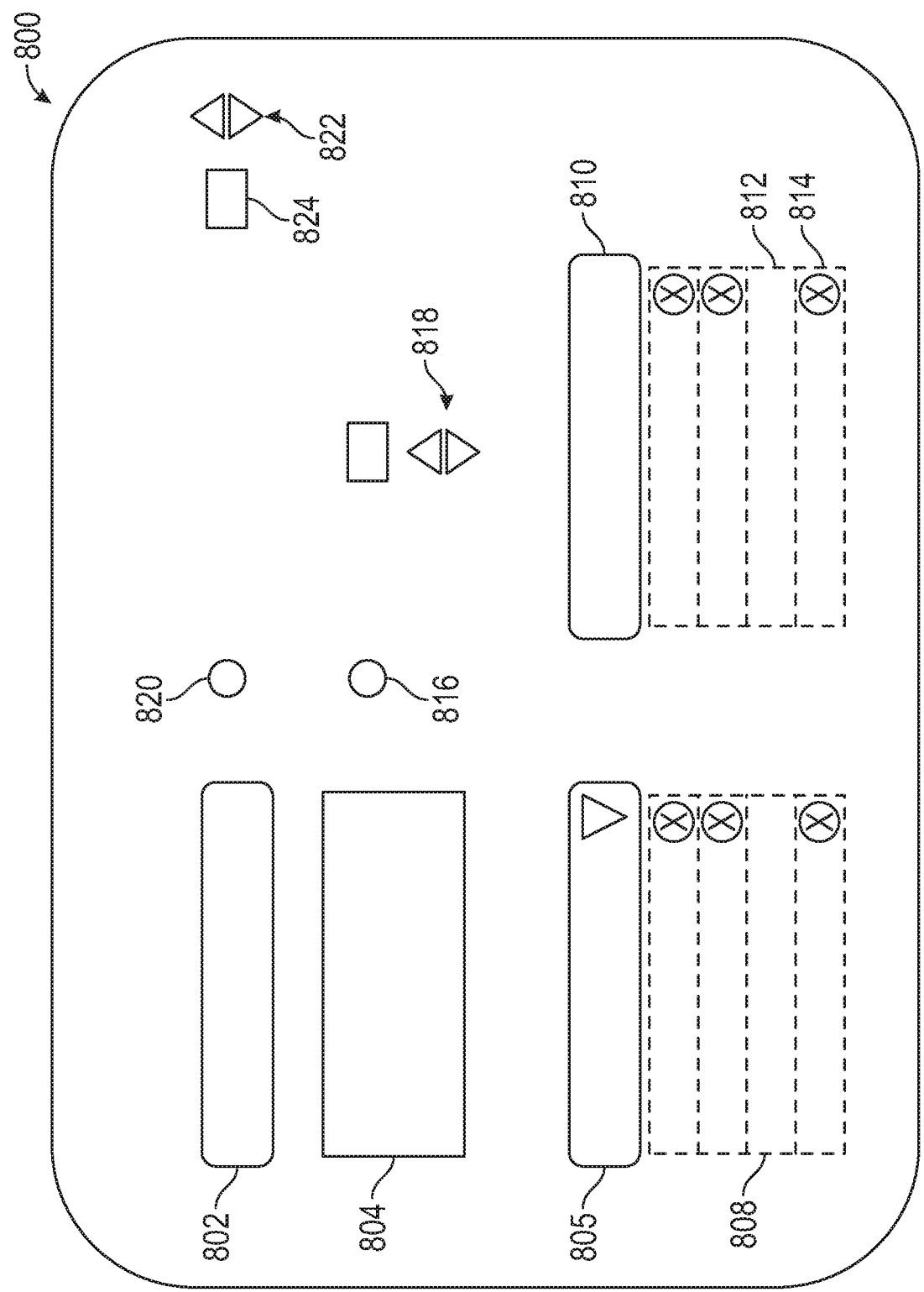

FIG. 8A illustrates an exemplary programming screen that is presented to the operator of the autonomous vehicle 10 in order to select parking spot preferences. Initially, the operator 10 would select the new destination button 802 and enter a destination identifier (e.g., shopping mall). The destination is then stored in the autonomous vehicle and may be selected by the set destination button 806, which may also be used select one of several preprogrammed destinations available at table 808. Once a destination has been selected, the autonomous vehicle 10 operates the autonomous vehicle to that destination. Once at the destination, the operator manually operates the vehicle to a first preferred parking location and park the autonomous vehicle 10 at that location. Once parked, the operator activates the programming button 810, which would set that parking location as a preferred parking location. The operator next operates the vehicle and manually parks in a next (or second) preferred parking location and again operates the set parking location button 810. As will be appreciated, this operation can be repeated for as many preferred parking locations as the operator desires, which can be viewed by the operator and edited (deleted 814) in table 812. While parked in a preferred parking location, the operator may activate the radio button 816 and operate selector 818 to program a number of adjacent parking spaces that are acceptable as parking locations to the preferred parking location. Also, as discussed above in connection with FIG. 6, the operator may activate radio button 820 to indicate that this parking location is a temporary parking location and operate the selector 822 to indicate the parking time limit associated with that temporary parking area which is displayed at 824. Upon interaction by the user with the programming screen, data is stored in a temporary or permanent data store for future use in operating the autonomous vehicle. In this way, following the method illustrated in FIG. 7, and with the adjacent parking location programming and temporary parking location programming options illustrated in FIG. 8, the operator may preprogram one or a series a preferred parking locations for any given destination.

FIG. 8B illustrates another exemplary programming screen that is presented to the operator of the autonomous vehicle 10 in order to select parking spot preferences. Initially, the operator 10 would select the new destination button 802 and enter a destination identifier (e.g., shopping mall). The destination is then stored in the autonomous vehicle and may be selected by the set destination button 806, which may also be used select one of several preprogrammed destinations available at table 808. Once the destination has been set, a map (e.g., high resolution or 3D map) is presented to the operator on a display 826. The operator may navigate by touch gestures and select a first preferred parking location by touching the parking spot (i.e., tap gesture). This preferred parking location can then be set by operating button 810. The operator may repeat this process for the number of preferred parking locations as desired, and are entered in preferential order of selection. The preferred parking locating order list 812 may be edited by deleting locations as desired by button 814 associated with each preferred parking location. The exemplary programming method of FIG. 8B offers an advantage in that the vehicle need not be operated to the destination, and each parking location at the destination, to program the parking preferences.

Figure 9:
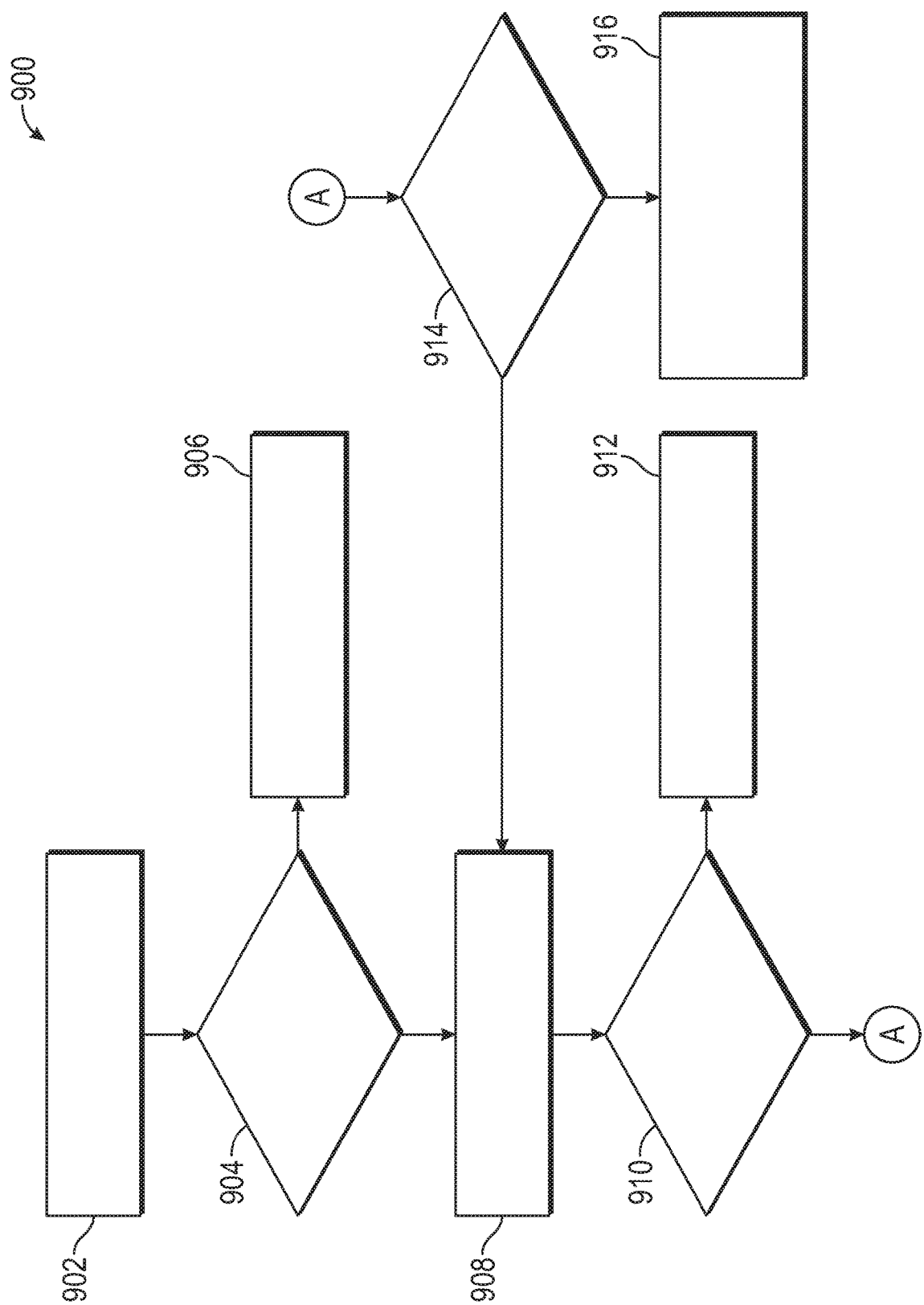
FIG. 9 is a flow diagram illustrating a method for autonomous parking by an autonomous vehicle in accordance with the present disclosure.

FIG. 9 is a flow diagram illustrating an exemplary method for autonomous end-to-end operation of an autonomous vehicle. The method of FIG. 9 is performed after initially performing the programming method discussed above in connection with FIG. 7 and FIGS. 8A-8B. The method begins in block 902 where the operator programs a destination into the autonomous vehicle 10 and the vehicle is autonomously operated to the destination. Once at the destination, the autonomous vehicle 10 locates the first preferred parking location using the coordinates previously stored by the operator in connection with the method of FIG. 7. In block 904, the autonomous vehicle 10 determines whether the first preferred parking location is available utilizing any of the sensor data available to the autonomous vehicle 10 (e.g., radar or camera imaging). If the determination of block 904 is that the first parking location is available, the autonomous vehicle performs an autonomous parking maneuver to parked vehicle in the preferred parking location in block 906. Conversely if the determination of block 904 is that the first parking location is not available (e.g., the first parking location is occupied by another vehicle) then the vehicle is autonomously operated to the next preferred parking location in block 908. Next, block 910 determines whether the next preferred parking location is available. If so, the autonomous vehicle performs an autonomous parking maneuver in block 912. However, if this next preferred parking location is unavailable then block 914 determines whether all preferred parking locations previously programmed by the operator have been exhausted. If not, the routine returns to block 908 until all preferred parking locations have been determined to be unavailable (i.e., occupied) at which point the autonomous vehicle will attempt to park in the closest available parking location to each preferred parking location in order of preference at the destination in block 916. That is, the autonomous vehicle 10 will first attempt to park as close as possible (e.g., within a preprogrammed limit) to the first preferred parking location. Upon failing to find an available parking location, the autonomous vehicle 10 will attempt to park as close as possible to the second preferred parking location, and so on. Should the autonomous vehicle 10 fail to find an available parking location within the preprogrammed limit for all preferred parking locations, the autonomous vehicle 10 would park the vehicle in any available parking location. In this way, autonomous end-to-end operation of the vehicle to a destination and a parking location is provided by the present disclosure.

Figure 10:
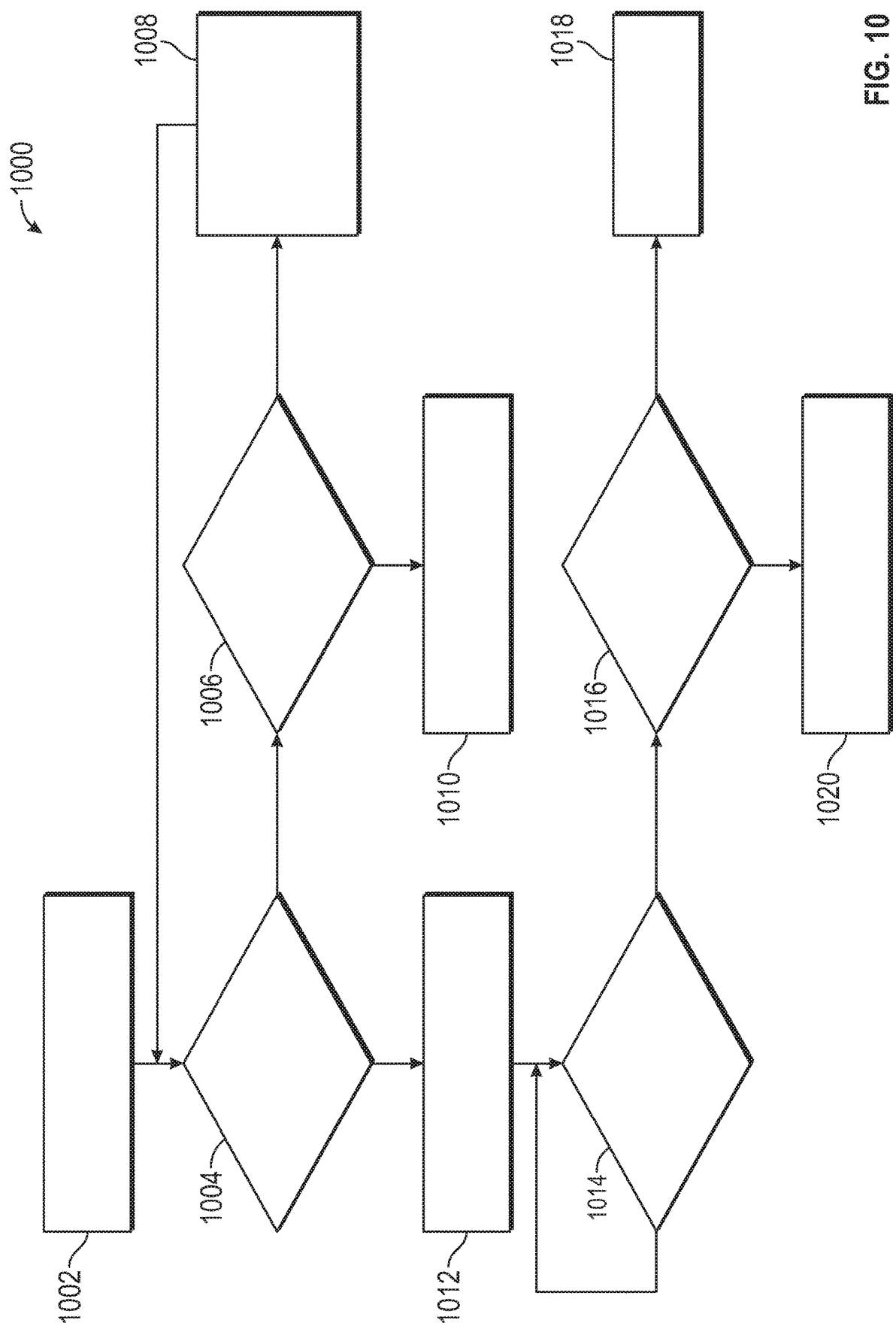
FIG. 10 is a flow diagram illustrating a method for autonomous parking passenger drop-off operation in accordance with the present disclosure.

As noted above, the present disclosure contemplates that a preferred parking location at a destination may constitute a temporary parking area utilized for drop-off or pickup of passengers or items. FIG. 10 is a flow diagram illustrating a drop-off method in accordance with exemplary embodiments of the present disclosure. In block 1002, the autonomous vehicle 10 is autonomously operated to a destination. In block 1004, the autonomous vehicle determines whether the drop-off zone (i.e., temporary parking location) is occupied. As noted above, this determination can be made using any available sensors onboard the autonomous vehicle 10 (e.g., radar or camera imaging). If the determination of block 1004 is that the drop-off zone is not occupied, the autonomous vehicle performs an autonomous parking maneuver in the drop-off zone in block 1012. Once parked in the drop-off zone, the autonomous vehicle determines whether the drop-off has been accomplished in block 1014. As a non-limiting example, the drop-off may be accomplished by a passenger exiting the autonomous vehicle 10. If the determination of block 1014 is that the drop off has not been accomplished, then the autonomous vehicle 10 will wait in the drop-off zone until the drop-off is accomplished (e.g., wait for the passenger to finish a cellular phone call). Once the drop-off is completed block 1016 determines whether the autonomous vehicle 10 has been instructed to wait for the passenger (e.g., wait until the passenger finishes shopping). If so, block 1020 has the autonomous vehicle 10 perform an autonomous parking maneuver in any available parking location to wait for the passenger to return. Optionally, the autonomous vehicle could perform the method illustrated in FIG. 9 to park in one of a programmed series of preferred parking locations to wait for the passenger to return. Conversely, if the determination of block 1016 is that the autonomous vehicle 10 is not to wait for the passenger, the autonomous vehicle 10 returns to whatever base parking (e.g., vehicle fleet parking) the autonomous vehicle initiated the trip from.

Returning to block 1004, if the determination is that the drop-off zone is occupied block 1016 determines whether a programmed number of drop-off attempts has been exhausted. If not, the autonomous vehicle may circle the parking lot, or move away from the temporary parking area for a time period and later return to the drop-off zone to see if it has become available. Conversely, if the determination of block 1006 is that the number of drop-off attempts have been exhausted then the autonomous vehicle is parked in any available parking location in block 1010. Optionally, as noted above, the autonomous vehicle could perform the method illustrated in FIG. 9 to park in one of a programmed series of preferred parking locations.

Figure 11:
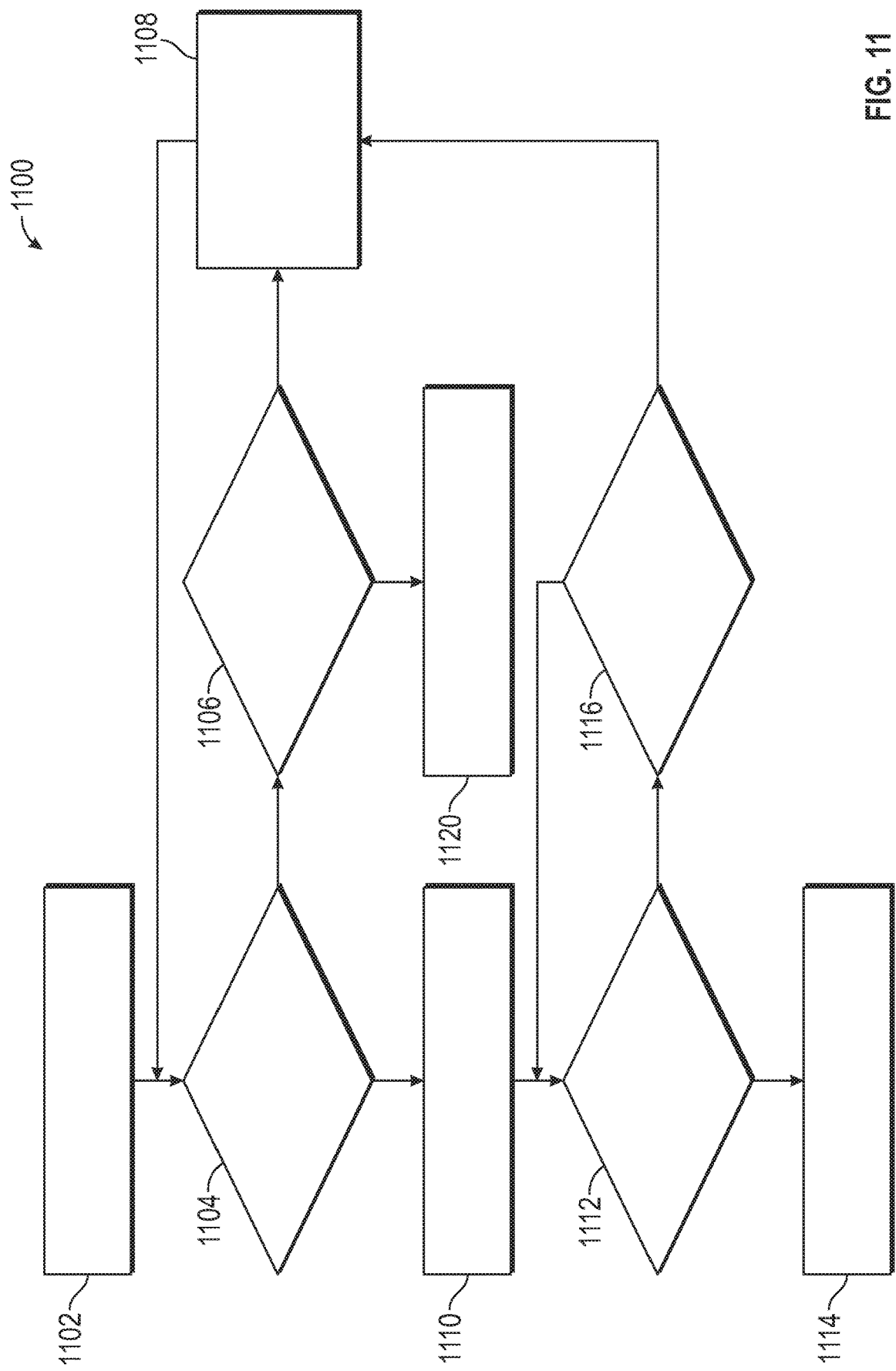
FIG. 11 flow diagram illustrating a method for an autonomous parking passenger pickup operation in accordance with the present disclosure.

FIG. 11 is a flow diagram illustrating an exemplary method of performing a pickup operation in a temporary parking location of a destination. The method begins in block 1102 where the vehicle is autonomously operated to a destination. Block 1104 determines whether the pickup zone is occupied. If not, the autonomous vehicle performs autonomous parking maneuver to park in the pickup zone in block 1110. Next, block 1112 determines whether the pickup has been accomplished. As a non-limiting example, the autonomous vehicle may determine that the pickup has been accomplished upon receiving an instruction to operate to a new destination in block 1114. If the determination of block 1112 is that the pickup has not been accomplished, block 1116 determines whether a parking time limit for remaining in the drop-off zone has expired. If not, the routine returns to block 1112 to wait for the pickup to be accomplished. Conversely if the determination of block 1116 is that the parking time limit has expired, then the autonomous vehicle 10 may circle the parking lot, or move away from the temporary parking area for a time period and later return to the pickup zone to see if it has become available.

Returning to block 1104, if the determination is that the pickup zone is occupied, block 1106 determines whether a number of programmed pickup attempts has been exhausted. If not, the autonomous vehicle may circle the parking lot, or move away from the temporary parking area for a time period and later return to the pickup zone to see if it has become available. Conversely, if the determination of block 1106 is that the number of pickup attempts has been exhausted, then the autonomous vehicle is parked in any available parking location in block 1120. Optionally, as noted above, the autonomous vehicle could perform the method illustrated in FIG. 9 to park in one of a programmed series of preferred parking locations.

While at least one exemplary aspect has been presented in the foregoing detailed description of the disclosure, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing an exemplary aspect of the disclosure. It being understood that various changes may be made in the function and arrangement of elements described in an exemplary aspect without departing from the scope of the disclosure as set forth in the appended claims.

What is claimed is:

1. A method for programming an autonomous vehicle to perform an autonomous parking maneuver upon a subsequent visit to a first parking lot, comprising:

manually operating the autonomous vehicle into a first preferred parking location at the first parking lot;

storing data representing first coordinates for the first preferred parking location;

manually operating the autonomous vehicle into a second preferred parking location at the first parking lot; and storing data representing second coordinates for the second preferred parking location;

storing a value representing a number of parking locations adjacent to each of the first preferred parking location and the second preferred parking location in which the autonomous vehicle may perform the subsequent autonomous parking maneuver when a respective one of the first and second parking locations is not available;

wherein the autonomous vehicle becomes programmed to perform a subsequent parking maneuver at the first parking lot autonomously using the first coordinates when the first preferred parking location is available and utilizing the second coordinates when the first preferred parking location is not available and the number of respective adjacent parking locations to the first preferred parking location are not available and the second preferred parking location is available, including the number of respective adjacent parking locations to the second preferred parking location or performing the subsequent parking maneuver at any available parking location when none of the first and second preferred parking locations, including the respective number of adjacent parking locations, are available.

2. The method of claim 1, further comprising:

manually operating the autonomous vehicle to a second parking lot;

manually operating the autonomous vehicle into a first preferred parking location at the second parking lot;

storing data representing first coordinates for the first preferred parking location at the second parking lot;

manually operating the autonomous vehicle into a second parking location at the second parking lot; and storing data representing second coordinates for the second preferred parking location at the second parking lot;

storing a value representing a number of parking locations adjacent to each of the first and second preferred parking locations at the second parking lot in which the autonomous vehicle may perform the subsequent autonomous parking maneuver when a respective one of the first and second parking locations at the second parking lot is not available;

wherein the autonomous vehicle becomes programmed to perform a subsequent parking maneuver at the second parking lot autonomously using the first coordinates when the first preferred parking location at the second parking lot is available and utilizing the second coordinates when the first preferred parking location at the second parking lot is not available and the number of respective adjacent parking locations to the first preferred parking location at the second parking lot are not available and the second preferred parking location is available, including the number of respective adjacent parking locations to the second preferred parking location at the second parking lot or performing the subsequent parking maneuver at any available parking location at the second parking lot when none of the first and second preferred parking locations at the second parking lot, including the respective number of adjacent parking locations at the second parking lot, are available.

3. The method of claim 1, further comprising storing destination information associated with the first preferred parking location.

4. The method of claim 1, wherein the first preferred parking location comprises a temporary parking location and the method further comprises storing data representing a parking time limit for parking in the temporary parking location.

5. A method for programming an autonomous vehicle to perform an autonomous parking maneuver upon a subsequent visit to a parking lot, comprising:

manually operating the autonomous vehicle to a plurality of parking locations, in a preferred order, at the parking lot; and storing coordinates of each of the plurality of parking locations;

storing a value representing a number of parking locations adjacent to each of the plurality of parking locations in which the autonomous vehicle may perform the subsequent autonomous parking maneuver when a respective one of the plurality of parking locations is not available;

wherein the autonomous vehicle becomes programmed to perform a subsequent parking maneuver autonomously at the parking lot by parking the autonomous vehicle at the first available location in the preferred order of the plurality of parking locations, including the number of respective adjacent parking locations to each of the plurality of parking locations or at any available parking location when none of the plurality of parking locations, including the respective adjacent parking locations, are available.

6. The method of claim 5, wherein at least one of the plurality of parking locations in the preferred order comprises a temporary parking location and the method further comprises:

during the subsequent visit to the parking lot performing the autonomous parking maneuver at the temporary parking location when the temporary parking location is available;

determining whether a parking time limit for parking at the temporary parking location has expired;

remaining in the temporarily parking locating until the parking time period has expired; and operating the autonomous vehicle away from the temporary parking location after the parking time period has expired.

7. The method of claim 6, further comprising returning to the temporary parking location after a time period to determine whether the temporary parking location has become available.

8. The method of claim 7, further comprising performing the autonomous parking maneuver at any available parking location when the temporary parking location remains unavailable.

9. The method of claim 6, further comprising operating the autonomous vehicle away from the temporary parking location when the temporary parking location is not available and returning to the temporary parking location after a time period to determine whether the temporary parking location has become available.

10. The method of claim 9, further comprising performing the autonomous parking maneuver at the any available parking location when the temporary parking location remains unavailable.

* * * * *